April 7, 1953 R. A. POAGE 2,633,811
PNEUMATIC BALANCING SYSTEM FOR TILTABLE BODIES
Filed Nov. 10, 1948 5 Sheets-Sheet 1

Inventor
Robert A. Poage
By John N. Randolph
Attorney

April 7, 1953 — R. A. POAGE — 2,633,811
PNEUMATIC BALANCING SYSTEM FOR TILTABLE BODIES
Filed Nov. 10, 1948 — 5 Sheets-Sheet 5

Inventor
Robert A. Poage
By John N. Randolph
Attorney

Patented Apr. 7, 1953

2,633,811

UNITED STATES PATENT OFFICE 2,633,811

PNEUMATIC BALANCING SYSTEM FOR TILTABLE BODIES

Robert A. Poage, Hannibal, Mo.

Application November 10, 1948, Serial No. 59,271

12 Claims. (Cl. 105—197)

This invention relates to a novel pneumatic balancing and supporting system for tiltable bodies and particularly to a novel actuating means for a control unit thereof.

Another object of the invention is to provide a pneumatic balancing system which is under pneumatic pressure throughout and including a control or directing unit which is interposed in the system and responsive to any and all forces resulting in an unbalanced load on the supporting means of the system for returning the load to a balanced position.

Another and particularly important object of the invention is to provide a balancing system which is responsive to such forces as gravity, centrifugal force, air resistance, wind and sway.

Another object of the invention is to provide a balancing system including pneumatic supporting cushions of relatively large size capable of functioning under a relatively low pressure to afford a soft cushioning support for a load carrying body.

A further object of the invention is to provide a novel pump for the system requiring no valves and which functions to produce a fluctuating pressure in a portion of the system for cooperation with the directing unit of the system for transferring pressure to an overloaded side of the system from the other side of the system which is bearing less than its share of the load for returning the load to a balanced position and which will function without affecting the load supporting portions of the system when a balanced condition of the system exists.

Other objects of the invention are to provide a pneumatic balancing system which is affected solely by differentials of pressure in the supporting means thereof, which is provided with a directing or control unit having valves which are actuated by fluctuation of pressure in a portion of the system produced by the pumping unit only when an unbalanced condition exists between the individual supporting means of the system, and in which the compressible gas, such as air, with which the system is inflated constitutes both the cushioning and the energy medium thereof.

A further object of the invention is to provide a system wherein said cushioning and energy medium is sealed within the system and under pressure throughout all portions of the system and due to its compressibility permits the necessary fluctuation of pressure in a portion of the system produced by the pumping unit.

Numerous other objects and advantages of the invention will hereinafter become more fully apparent from the following description of the drawings, illustrating presently preferred embodiments thereof, and wherein.

Figure 1:
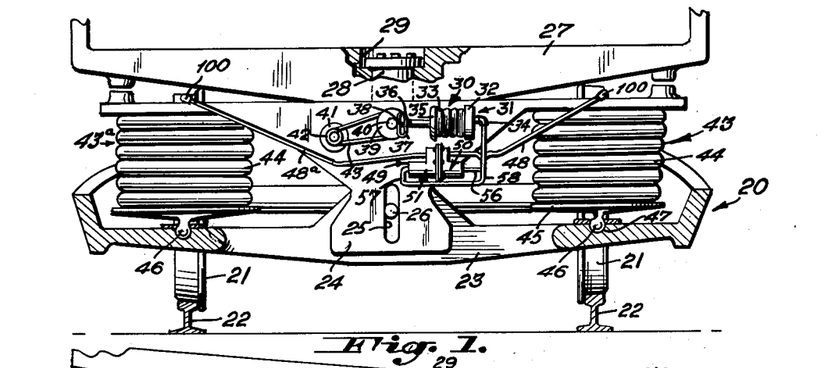
Figure 1 is an end elevational view partly in cross section illustrating a simple embodiment of the invention applied to the truck of a railroad car for supporting an end of the car body thereon and illustrating the system in a balanced condition.
Figure 2:
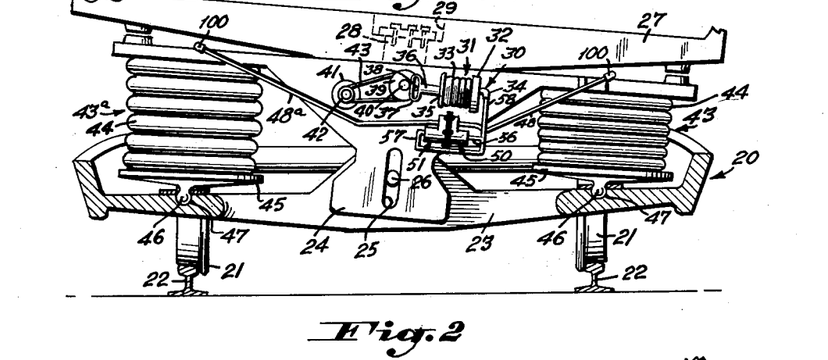
Figure 2 is a view similar to Figure 1 but illustrating the system in an unbalanced condition and with the preponderance of the load on the right-hand side thereof.
Figure 3:
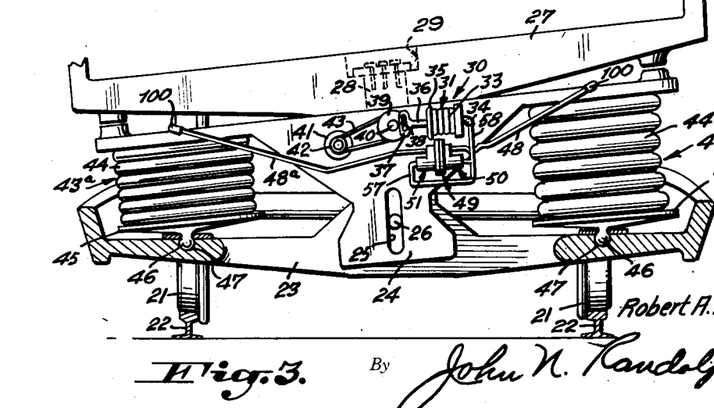
Figure 3 is a view similar to Figure 1 but showing the system unbalanced in the opposite direction resulting from a preponderance of the load leaning to the left.

Referring more specifically to the drawings and first with reference to Figures 1, 2 and 3, to illustrate a preferred application and use of the pneumatic balancing system for tiltable bodies, the numeral 20 designates generally a truck of a railroad car provided with flanged wheels 21 shown engaging a pair of rails 22. The truck 20 is illustrated as including an undercarriage 23 and a bolster 24 the vertical sides of which are vertically slotted as seen at 25 to accommodate pins 26 which are disposed longitudinally of the truck on the undercarriage 23 for mounting the bolster 24 for vertical reciprocating movement and lateral rocking movement relatively to the undercarriage 23. A crossbeam of a railway car body, as seen at 27, is supported on the upper surface of the bolster 24 and is swivelly connected to the truck 20 by a vertical kingpin 28 which rises from the center of the bolster 24 and turnably engages a countersunk opening 29 of the body crossbeam 27. It is to be understood that the structure previously described is conventional and has been disclosed merely to illustrate one application of the pneumatic balancing system one form of which, designated generally 30, is shown applied to the truck 20 in Figures 1, 2 and 3.

Figures 6, 7, 8, 13:
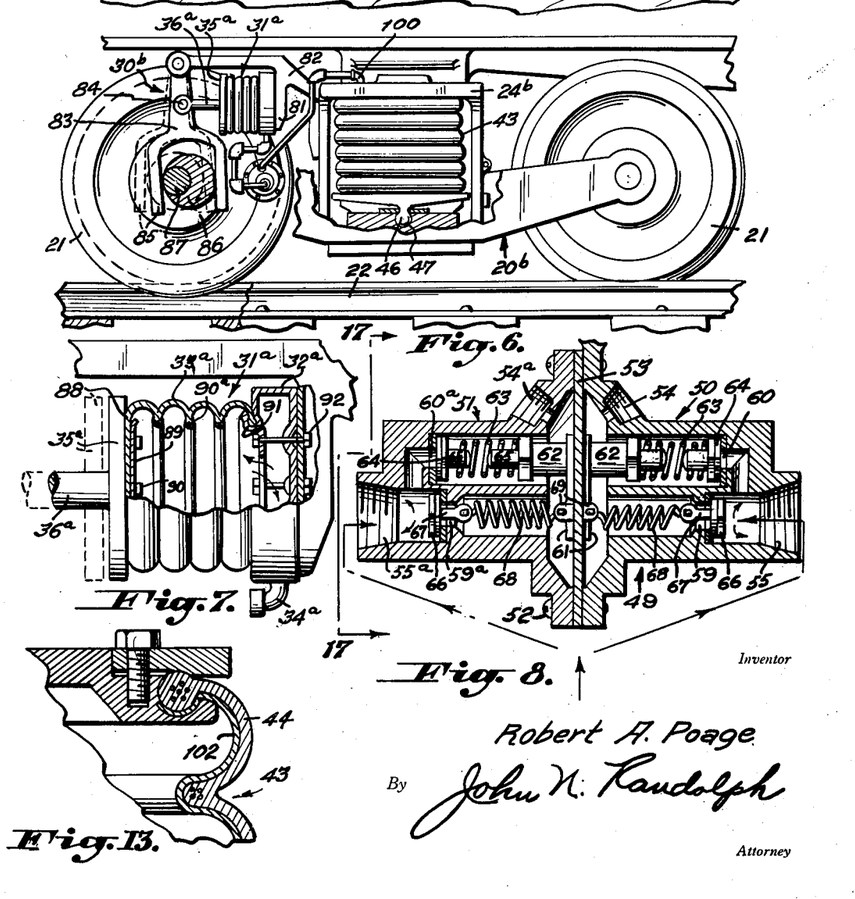
Figure 6 is a side elevational view, partly in vertical section illustrating another form of pump actuating means for the pneumatic system.
Figure 7 is an enlarged side elevational view partly in section of the pump, constituting a part of the system.
Figure 8 is a central vertical sectional view of the directing unit or control unit of the system as it will appear when a balanced load condition exists, as in Figure 1.
Figure 13 is a view similar to Figure 12 but illustrating a slightly modified form of the cushioning supporting member.

The pneumatic balancing system 30 is illustrated as including a bellows-type pump 31 composed generally of a compression chamber 32 and a bellows 33 having an open end fastened to and communicating with the chamber 32. The pump 31 corresponds to the pump 31a as illustrated in Figure 7 in all respects except that the compression chamber 32 has an inlet and outlet nipple 34 located in its outer side whereas the inlet and outlet nipple 34a of the pump 31a is disposed in a portion of the periphery of the compression chamber 32a. The pump 31 may be mounted on the bolster 24 by means of any suitable bracket, not shown, extending from the compression chamber 32 and secured to the bolster 24. A plate or head 35 is fastened to the opposite, closed end of the bellows 33 and has a rod 36 projecting therefrom in a direction away from the pump 31 and which terminates in an elongated loop 37 which is disposed transversely to the axis of said rod for loosely engaging a crankpin 38 which is mounted eccentrically on a wheel or pulley 39 which is journalled on a stub-shaft 40 projecting from a portion of the bolster 24. The wheel or pulley 39 may be revolved in any manner for causing the eccentric pin 38 to reciprocate the rod 36 and bellows 33 for producing a fluctuation of pressure within the compression chamber 32, as by means of an electric motor 41 suitably supported on the bolster 24 and having a drive shaft provided with a pulley 42 which is connected by a belt 43 to the pulley 39.

The balancing system 30 includes a pair of corresponding cushioning supporting members, each designated generally 43 and which are disposed in laterally spaced relationship relatively to the longitudinal axis of the truck 20 and between corresponding portions of the undercarriage 23 and bolster 24 for yieldably supporting the lateral ends of the bolster 24 on the undercarriage 23. Each of the supporting members includes a bellows 44 having a closed lower end which is secured to and supported on a base 45. The base 45 is provided with a depending rounded projection 46 which seats in an upwardly opening recess 47 in the undercarriage 23 for supporting the base 45 for oscillating movement in all directions upon said undercarriage.

Each of the supporting members 43 is closed except for a connection at its upper end with a conduit 48 which communicates with the interior thereof and which leads therefrom to one side of a directing or control unit, designated generally 49. For clarity in subsequently describing the operation of the system 30, the left-hand supporting member will hereinafter be referred to generally as the supporting member 43a and the conduit thereof will be described as the conduit 48a.

Figures 5, 9, 10, 11, 12, 17:
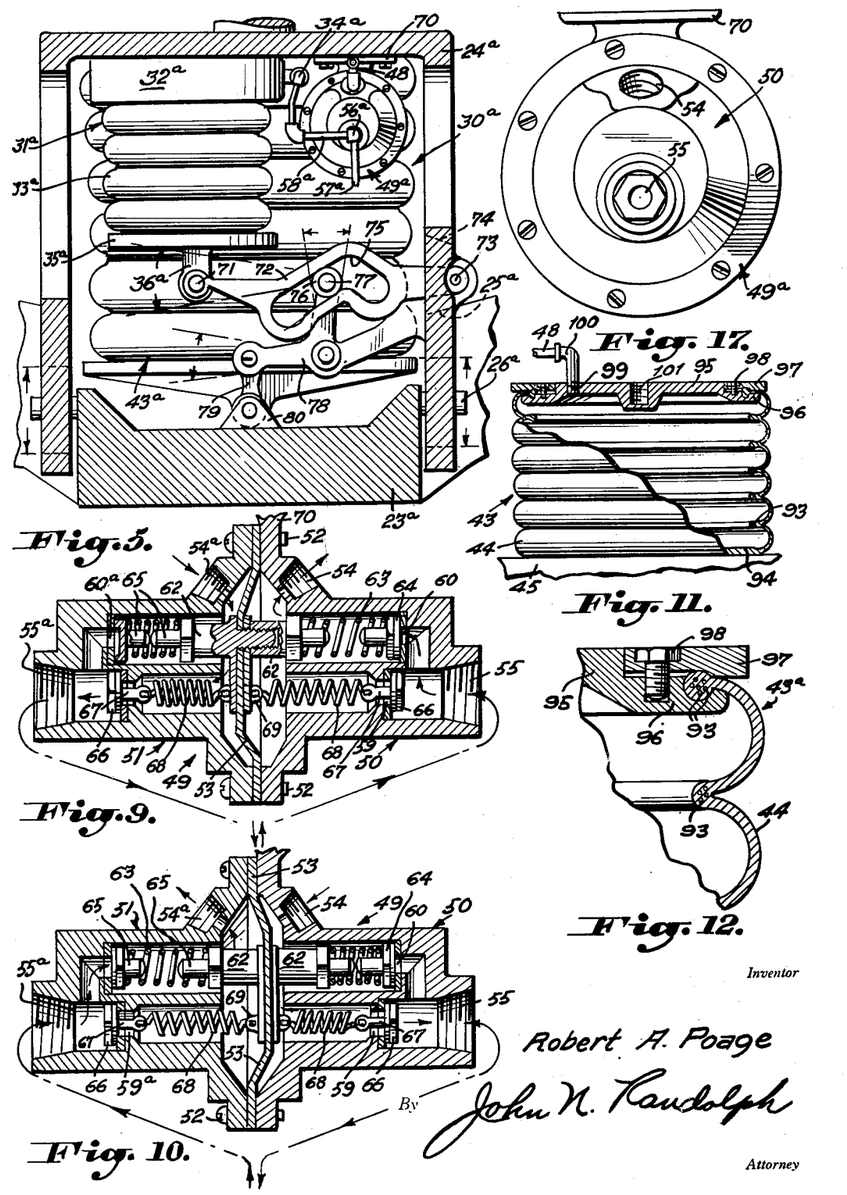
Figure 5 is an enlarged fragmentary vertical sectional view taken substantially along a plane as indicated by the line 5—5 of Figure 4.
Figure 9 is a view similar to Figure 8 but showing the directing unit as it will appear when an unbalanced load condition exists on the system as in Figure 2.
Figure 10 is a view similar to Figure 8 but showing the directing unit as it will appear when an unbalanced load condition exists on the system as illustrated in Figure 3.
Figure 11 is a side elevational view, partly in vertical section, of one of the cushioning supporting members of the system.
Figure 12 is a fragmentary vertical sectional view of a portion thereof on an enlarged scale.
Figure 17 is an end view in elevation of the directing unit taken substantially along a plane as indicated by the line 17—17 of Figure 8.

The directing unit 49 is formed of corresponding end sections 50 and 51 having detachably connected flanged inner ends secured together by fastenings 52 which also clamp the peripheral portions of a diaphragm 53 forming a partition between the sections 50 and 51, as clearly illustrated in Figures 8, 9 and 10. The sections 50 and 51 are provided with complementary internally threaded ports 54 and 54a, respectively for receiving the opposite ends of the conduits 48 and 48a and said sections 50 and 51 are provided with lower internally threaded ports 55 and 55a, respectively for accommodating complementary ends of branch conduits 56 and 57 which join with a main conduit 58 which is connected to the nipple 34 and accordingly in communication with the pump 31.

The section 50 of the directing unit 49 is provided with a lower outlet port 59 and an upper inlet port 60, adjacent its outer end, each of which ports communicates with the port 55. The section 51 is provided with complementary ports 59a and 60a each of which communicates with the port 55a. Corresponding plates 61 are suitably secured to opposite sides of the central portion of the diaphragm 53 and each of said plates has a head 62 projecting perpendicularly therefrom forming an abutment for one end of an expansion coiled spring 63 the opposite end of which seats against a valve 64. Each of the inlet ports 60 and 60a is normally closed by one of the valves 64 and said heads 62 and valves 64 are provided with stems 65 which project from adjacent sides thereof for supporting the end portions of the springs 63. The valves 64 are disposed on the internal sides of the inlet ports 60 and 60a and the outlet ports 59 and 59a are normally closed by externally disposed, outwardly opening valves 66 having stems 67 extending inwardly through said ports and which are provided on their inner ends with eyes each of which is adapted to engage an end of a contractile coiled spring 68. The opposite, adjacent ends of the springs 68 are connected to eyes 69 on the plates 61 and function to normally urge the valves 66 inwardly for closing the outlet ports 59 and 59a.

Assuming that the system as illustrated in Figures 1, 2 and 3, including the pump 31, the supporting cushioning members 43 and 43a, the directing unit 49 and the conduits connecting said parts is filled with a compressible gas such as air and assuming that the motor 41 is operating to revolve the pulley wheel 39 for actuating the pump 31, if the load is in a balanced position as illustrated in Figure 1 the directing unit 49 will be in the position of Figure 8 so that the compressible medium will merely be compressed and permitted to expand as the pump 31 is operated, as to the portion thereof disposed within said pump and in the conduit 58, since the pressure of the compressed medium in the supporting members 43 and 43a will be in communication with the directing unit on each side of the diaphragm 53 so that there will be no tendency for the diaphragm to be displaced in either direction from its position of Figure 8 so that the pressure exerted by the springs 63 and 68 will be substantially equal and sufficient with the pressure from the supporting members 43 and 43a to maintain the valves 64 and 66 in their closed positions of Figure 8. However, this will not prevent the pump 31 from operating since the medium can be compressed therein, as previously described. The pump bellows 33 is similar in construction to the bellows 44 of the supporting members and the pressure in the compression chamber 32 thereof rises and falls in relationship to the movement of the butt plate 35 toward and away from said compression chamber 32, respectively. The stroke of the butt plate 35 is sufficient to fluctuate the pressure within the chamber 32 to an extent substantially greater than the differential of pressures encountered in the cushioning supporting members 43 and 43a or, in other words, the pressure in the chamber 32 rises higher than the pressure in the overloaded cushioning member 43 or 43a and falls to a point lower than the pressure in the other, underloaded cushioning member, when the load is not equally balanced, as illustrated in Figures 2 and 3. For example, assuming that the load supported by the cushioning members is such as to require a fifty pound pressure per square inch therein, when a balanced condition exists, whereas a maximum unbalanced condition of said cushioning members would result in a pressure of forty pounds per square inch in the underloaded cushioning member and sixty pounds per square inch in the overloaded cushioning member. With this differential of pressure of twenty pounds per square inch maximum established, the pump 31 is constructed capable of causing a thirty pound pressure per square inch fluctuation in the compression chamber 32, ranging between thirty-five pounds and sixty-five pounds. With the load in balance as illustrated in Figure 1, the directing unit 49 as illustrated in Figure 8 is likewise in balance and with the diaphragm centered and with the pairs of valves 64 and 66 equally spring loaded. The springs of said valves have sufficient strength to prevent the valves from being opened by the aforementioned fluctuation of pressure in the compression chamber 32 so that no air passes through the directing unit 49.

With the load unbalanced and heavier on the right, as illustrated in Figures 2 and 9, the diaphragm 53 is displaced to the left by the additional pressure from the conduit 48 so that the pairs of valves are thus unequally spring loaded. This will cause the tension on the valve spring 63 of the directing unit section 50 to be decreased as the tension of the other valve spring 63 is increased so that the left-hand valve 64 remains closed while the right-hand valve 64 will be opened by the pressure rise in the compression chamber 32 to permit air to pass into the directing unit section 50 through the port 60 thereof for increasing the pressure in the cushioning member 43. Likewise, the tension of the spring 68 of the directing unit section 50 is increased to hold the valve 66 thereof in a closed position while the pressure of the other spring 68 is decreased so that the left-hand valve 66, constituting a part of the directing unit section 51, may open to release the pressure therefrom and to diminish the pressure in the other, left-hand cushioning member 43a, when the pressure in the pump chamber 32 falls to its minimum, thus effecting a transfer of pressure from the underloaded cushioning member 43a to the overload cushioning member 43 for the purpose of returning the load to its balanced position, as illustrated in Figure 1.

It will be readily apparent from the foregoing that the operation just previously described will be reversed when the cushioning member 43a is overloaded, as illustrated in Figure 3.

Furthermore, since the pump 31 is operating constantly, it will function to return the load to a balanced position whether the unbalancing of the load results from gravity due to an unequal distribution of pay load, centrifugal force resulting from the vehicle moving around a turn, air resistance caused by passing near an object located close to one side of the vehicle, the lateral force of wind against one side of the vehicle body or sway due to undulation of the track.

Figure 4:
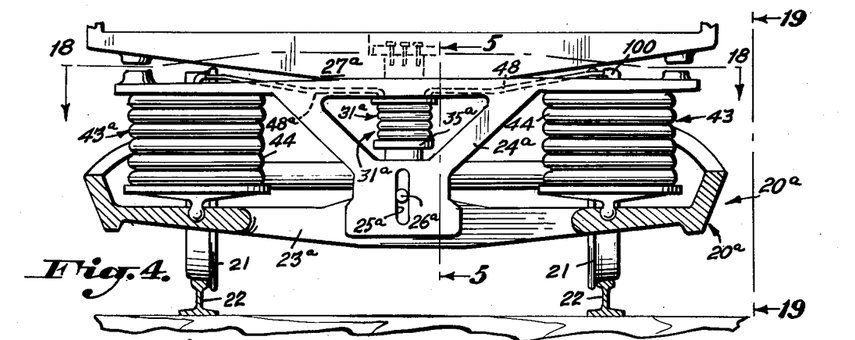
Figure 4 is a view similar to Figure 1 illustrating a slightly modified form of the railroad truck and another, preferred form of actuating means for the pumping unit of the system, taken substantially along a plane as indicated by the line 4—4 of Figure 18.

The form of the invention previously described and as illustrated in Figures 1, 2 and 3, constitutes a simple embodiment of the pneumatic balancing system, a preferred form of which is illustrated in Figures 4 and 5, wherein the truck 20a differs from the truck 20 only in that the forward and rear depending sides of the bolster 24a are provided with substantially triangular-shaped openings. Likewise, the cross beam 27a is swively supported on the bolster 24a in the same manner as the cross beam 27 on bolster 24.

The pneumatic balancing system of Figures 4 and 5 designated generally 30a includes a pump 31a having a compression chamber 32a and a bellows 33a. The pump 31a is disposed substantially in a vertical position with the outer, closed side of the compression chamber 32a being secured in any suitable manner to the underside of the upper part of the bolster 24a. The pump 31a differs from the pump 31 in that the inlet and outlet fitting 34a thereof extends through the side wall of the compression chamber 32a. The butt plate 35a of the pump 31a corresponds with the butt plate 35 but in lieu of being provided with the rod 36 is provided with an apertured ear 36a which depends therefrom. The directing unit 49a of the system 30a corresponds in all internal detail with the directing unit 49 and is supported on the underside of the bolster 24a by an external bracket 70 which is bolted to the under surface of the uper part of the bolster 24a. The directing unit 49a is connected by the fitting 34a to the pump 31a by conduits 56a, 57a and 58a, in the same manner that the pump 31 is connected to the directing unit 49. As the cushioning members of the system 30a are identical with those of the system 30, these cushioning members bear the same reference characters 43 and 43a and are connected by corresponding conduits 48 and 48a to the directing unit 49a.

The pneumatic balancing system 30a differs from the system 30 primarily in the means for actuating the pump. In the system 30a the electric motor is eliminated and in lieu thereof the ear 36a is pivotally connected at 71 to one end of a lever 72 the opposite end of which lever is pivotally connected at 73 to a slotted portion 74 of one vertical wall of the bolster 24a and which slotted portion or recess 74 is vertically elongated to accommodate swinging movement of said last mentioned end of the lever 72. The lever 72 is provided with an elongated slotted portion 75 having angularly disposed end portions forming a guide for a roller 76 which is mounted for movement within the slot of said portion 75 and which is journaled on a pin 77 which projects from one side of one arm of a bell crank 78 which is disposed to one side of the lever 72. The bell crank 78 is pivotally mounted at its apex on an arm 79a which projects from said aforementioned vertical wall of the bolster 24a, to one side of the recess 74. The other arm of the bell crank 78 is pivotally connected to one end of a link 79 the opposite end of which is pivotally connected to an ear 80 which rises from the upper side of the undercarriage 23a. The vertical slot 25a of the bolster 24 which loosely receives the pins or trunnions 26a of the undercarriage 23a permits the bolster to reciprocate vertically with respect to the undercarriage and to rock relatively thereto. This movement of the bolster relatively to the undercarriage caused by imperfections in the roadbed over which the truck 20a is moving affords the power for actuating the pump 31a to reciprocate the bellows 33a thereof as the butt plate 35a is moved toward and away from the compression chamber 32a as it will be readily apparent that any vertical or rocking motion of the bolster relatively to the undercarriage which causes the bolster to move downwardly, will cause the bell crank 78 to be rocked clockwise as seen in Figure 5 and to move upwardly with respect to the left-hand end of the slotted portion 75 for forcing the butt plate 35a toward the compression chamber 32a for compressing the compressing medium therein whereas upward movement of the bolster relatively to the undercarriage will cause the bell crank 78 to rock counterclockwise and will cause its roller 77 to ride downwardly and to the left of the slotted portion 75 for drawing the butt plate 35a away from the compression chamber 32a for reducing the pressure therein. It will likewise be readily apparent that this reciprocating motion of the pump will occur almost without interruption while the truck 20a is in motion and will result in maintaining the load supported by the cushioning supporting members 43 and 43a in a balanced condition in the same manner as previously described. The lever 72 and bell crank 78 are disposed substantially intermediate of the ends of the undercarriage and bolster.

Figure 6 illustrates another means of actuating the pump in a pneumatic balancing system which is designated generally 30b and which utilizes a pump corresponding to that of the system 30a and which is accordingly designated generally 31a. The pump 31a is supported with its axis substantially in a horizontal plane and secured to an upright surface 81 forming a part of an arm 82 which extends either forwardly or rearwardly from the bolster 24b. A lever 83 is pivotally connected at one end thereof to the outer end of the arm 82 and depends downwardly therefrom. The butt plate 35a as seen in Figure 6, is provided with a slightly elongated ear or extension 36a which is pivotally connected at 84 to the lever 83 adjacent the upper end of said lever which is pivoted on the supporting arm 82. The lever 83 is provided with a depending fork 85 constituting its opposite lower end and which is adapted to straddle a cam 86 which is fixed to one of the axles 87 of the truck 20b on which the pneumatic system 30b is mounted. The pneumatic system 30b includes cushioning supporting members corresponding to those of the systems 30 and 30a as well as a corresponding directing unit which is connected in the same manner to said cushioning supporting members and to the pump 31a.

From the foregoing it will be readily apparent that when the truck 20b is in motion the wheel axle 87 will revolve with the wheels to which it is connected for revolving the cam 86 to cause the lever to swing back and forth from right to left as illustrated in full and dotted lines in Figure 6 for moving the butt plate 35a toward and away from the compression chamber of the pump 31a in the same manner and for the same purpose as previously described with reference to the system 30.

The pump 31a is illustrated in detail in Figure 7 wherein it will be noted that the bellows 33a thereof is provided with a closed end 88 which is clamped between the butt plate 35a and a retaining plate 89 by fastenings 90. The annular side wall of the bellows 33a is corrugated with the inner portion of the corrugation reinforced by cables or the like as seen at 90a. The open end of the bellows 33a is clamped to the open side of the compression chamber 32a by a clamping ring 91 held by nut and bolt fastenings 92 which also fasten the compression chamber to the supporting surface 81. The opening of the clamping ring 91 forms the passage between the bellows and compression chamber. It will be readily apparent that the pump of Figures 4 and 5 could be similarly supported on the bolster 24a and similarly constructed internally and the pump 31 is likewise of the same construction except for the location of the fitting 34.

Figures 11 and 12 illustrate details of the supporting cushioning members, designated generally 43 or 43a and which is similar in construction to the bellows of the pump 31 or 31a since the bellows 44 thereof is likewise corrugated and has reinforcing cables 93 on the inner portions of its side wall. The lower, closed end 94 of the bellows 44 is secured in any suitable manner to its table 45 and the open upper end of the bellows 44 is closed by a plate 95 having a downwardly offset marginal edge portion 96 on the upper side of which the open end of the bellows 44 engages and to which said open end is clamped by a clamping ring 97 which is detachably secured to the plate 95 by screw fastenings 98. The clamping ring 97 and fastenings 98 are disposed in recesses of the plate 95 and ring 97, respectively, so as to be disposed flush with the upper surface of the plate 95. The plate 95 has a threaded opening 99 to receive an L-shaped nipple 100 which extends upwardly therefrom and to which the conduit 48 or 48a is adapted to be connected. The plate 95 engages against a portion of the underside of the bolster 24, 24a or 24b and the nipple 100 extends upwardly through the bolster to connect with the end of the conduit 48 or 48a which is disposed thereabove. In the form of Figures 1, 2 and 3 and also in the form of the invention as illustrated in Figure 6, the conduits 48 and 48a extend upwardly and over a side edge of the top portion of the bolster whereas in the form of Figures 4 and 5 the conduits 48 and 48a as indicated in dotted lines in Figure 4 extend upwardly through diagonal openings, not shown, in the top portion of the bolster 24a. The plate 95 is provided with an upwardly opening threaded recess 101 which may be utilized to receive a bolt, not shown, extending downwardly through the bolster for detachably fastening the cushioning member 43 or 43a thereto.

Figure 13 illustrates a slightly modified form of the cushioning member 43 or 43a and wherein the bellows 44 thereof is provided with an inner lining 102 of rubber or the like.

Figure 14:
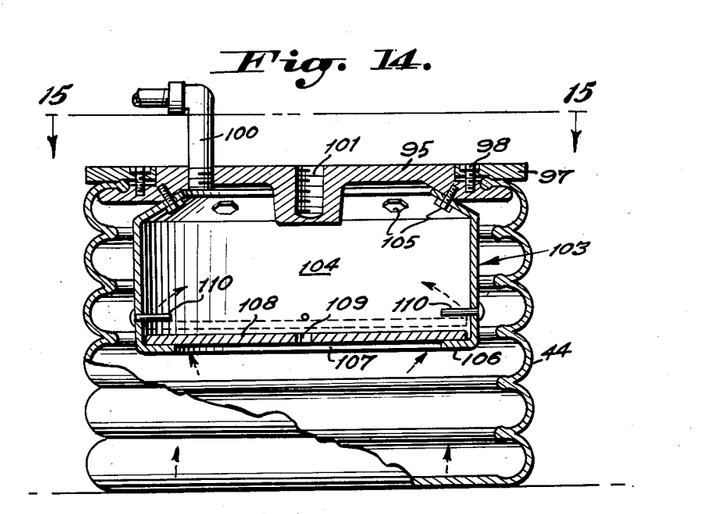
Figure 14 is a view similar to Figure 11 showing another form of the cushioning supporting member.
Figures 15, 16:
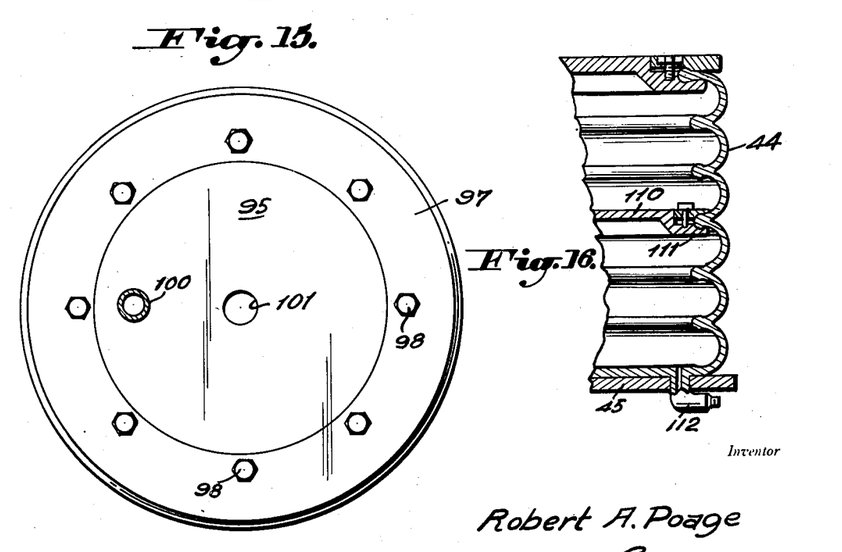
Figure 15 is a top plan view thereof taken substantially along a plane as indicated by the line 15—15 of Figure 14.
Figure 16 is a fragmentary vertical sectional view of another form of the supporting cushioning member.

Figures 14 and 15 illustrate another modification of the cushioning supporting member and which is additionally provided with an internal snubber unit, designated generally 103 which is in communication with the nipple 100 and which includes a housing 104 secured by a fastening 105 to the underside of the plate 95 and which is closed at its upper end by said plate. The housing 104 is provided at its lower end with a continuous inturned flange 106 defining a relatively large opening 107 which is normally closed by a plate 108 except for a small port 109 in said plate. The plate 108 normally rests on the flange 106. The plate 108 is smaller than the internal cross section of the housing 104 and is limited in its movement away from the flange 106 by the stop pins 110. This rebound snubber unit 103 will permit the ends of the bellows 44 to yield rapidly toward one another since the plate 108 will then be unseated as indicated in dotted lines in Figure 14 so that the air can enter the housing 104 around said plate 108. However, upon rebound or expansion of the bellows 44, the plate 108 will assume its full line, closed position so that the compressed medium can only escape from the housing 104 into the bellows 44 through the breather port 109.

Figure 16 illustrates another form of the cushioning supporting member and which is provided with a central dividing plate 110 having a peripheral clamping portion 111 for engaging an intermediate portion of the bellows 44 for dividing the chamber thereof into upper and lower compartments. The upper compartment thereof communicates with the nipple 100, not shown, and the lower compartment may be provided with a nipple 112 which extends downwardly through the table 45 and which could be connected with the same or a different source of a compressible medium or with an hydraulic medium if desired.

Figure 18:
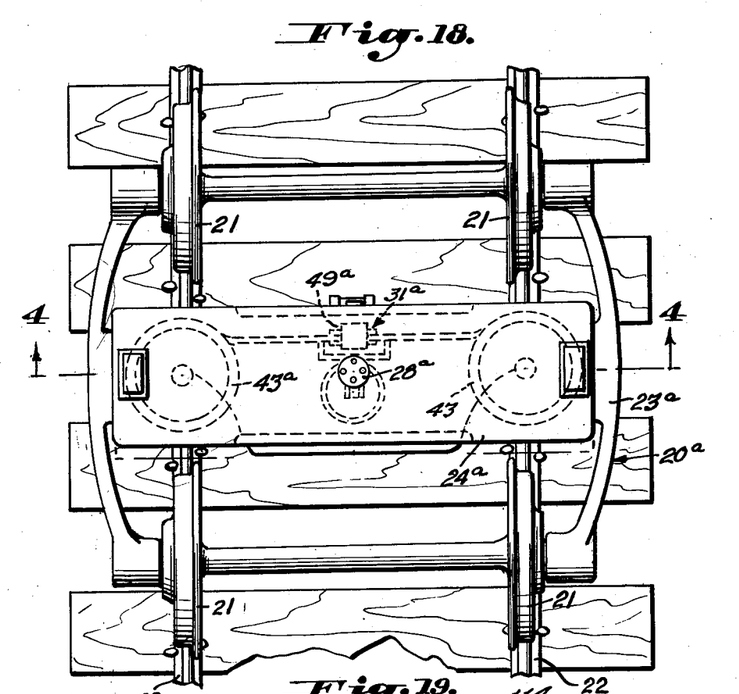
Figure 18 is a horizontal sectional view taken substantially along a plane as indicated by the line 18—18 of Figure 4.
Figure 19:
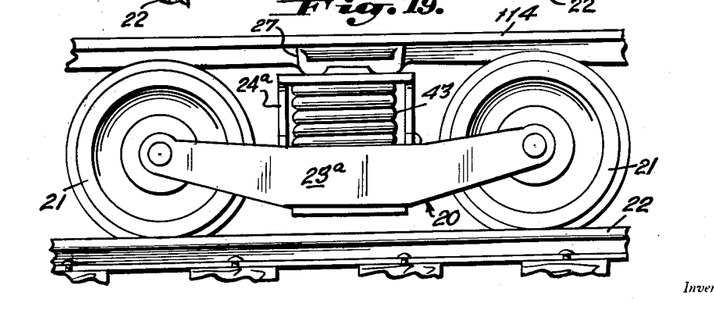
Figure 19 is a side elevational view taken substantially along a plane as indicated by the line 19—19 of Figure 4.

Figure 18 shows the truck 20a as it would appear from above and equipped with the pneumatic system as illustrated in Figures 4 and 5 and designated generally 31a and Figure 19 is a side elevational view of the truck and showing a portion of a vehicle body 114 supported thereby on the body crossbeam 27 which is swivelly connected to the bolster 24a.

Various modifications and changes are contemplated and may obviously be resorted to, without departing from the spirit or scope of the invention as hereinafter defined by the appended claims.

I claim as my invention:

1. A vehicle balancing system closed throughout and containing a compressible medium for maintaining the system under pressure throughout, comprising laterally spaced cushioning supporting members adapted to be interposed between an undercarriage and a bolster of a vehicle body supporting truck and equally spaced from the sides of the truck for yieldably supporting the bolster above the undercarriage, said cushioning supporting members each including an inflatable chamber capable of being compressed between the bolster and undercarriage in response to lateral tilt of the bolster; a sealed conduit system including said cushioning supporting members containing a compressed medium under pressure, driven means connected to the conduit system for producing a fluctuation of pressure in said conduit system, and a directing unit interposed in said conduit system between said fluctuation producing means and the cushioning supporting members and provided with spring loaded valves to prevent flow of the compressed means through said directing unit when the pressure of a load on the cushioning supporting members is substantially balanced, said valves being actuated in response to an unbalanced load condition on the cushioning supporting members to cause the compressed medium to flow past the directing unit as the pressure fluctuates in the system toward an overloaded supporting member and away from an underloaded supporting member.

2. A vehicle balancing system as in claim 1, said cushioning supporting members each including a sealed bellows-type flexible chamber inflated by the compressible medium to provide a yieldable support for the bolster, and a snubber unit contained within said chamber for restricting the flow of the compressible medium thereto for regulating the expansion of the chamber.

3. A vehicle balancing system as in claim 1, said cushioning supporting members each including a sealed bellows-type flexible chamber inflated by the compressible medium to provide a yieldable support for the bolster, and a partition dividing said chamber into separate upper and lower compartments.

4. A vehicle balancing unit comprising a conduit system closed throughout and containing a compressible medium for maintaining the system under pressure throughout, laterally spaced cushioning supporting members connected to and forming a part of the conduit system and adapted to be interposed between an undercarriage and a bolster of a vehicle body supporting truck and equally spaced from the sides of the truck for yieldably supporting the bolster above the undercarriage, said cushioning supporting members each including an inflatable chamber capable of being compressed between the bolster and undercarriage in response to lateral tilt of the bolster; driven means for producing a fluctuation of pressure in said system, and a directing unit interposed in said system between said fluctuation producing means and the cushioning supporting members and provided with spring loaded valves to prevent flow of the compressed medium through said directing unit when the pressure of a load on the cushioning supporting members is substantially balanced, said valves being actuated in response to an unbalanced load condition on the cushioning supporting members to cause the compressed medium to flow past the directing unit as the pressure fluctuates in the system toward an overloaded supporting member and away from an underloaded supporting member, said driven means for fluctuating the pressure in the system including a pump having a compression chamber forming one end thereof and a bellows constituting the opposite end of the pump and defining a chamber of variable size in communication with the compression chamber.

5. A vehicle balancing unit comprising a conduit system closed throughout and containing a compressible medium for maintaining the system under pressure throughout, laterally spaced cushioning supporting members connected to and forming a part of the conduit system and adapted to be interposed between an undercarriage and a bolster of a vehicle body supporting truck and equally spaced from the sides of the truck for yieldably supporting the bolster above the undercarriage, said cushioning supporting members each including an inflatable chamber capable of being compressed between the bolster and undercarriage in response to lateral tilt of the bolster; driven means for producing a fluctuation of pressure in said system, and a directing unit interposed in said system between said fluctuation producing means and the cushioning supporting members and provided with spring loaded valves to prevent flow of the compressed medium through said directing unit when the pressure of a load on the cushioning supporting members is substantially balanced, said valves being actuated in response to an unbalanced load condition on the cushioning supporting members to cause the compressed medium to flow past the directing unit as the pressure fluctuates in the system toward an overloaded supporting member and away from an underloaded supporting member, said directing unit comprising an elongated housing, a resilient diaphragm dividing said housing into corresponding end sections, each of said end sections being in communication with the portion of the system leading from the directing unit to said driven fluctuation producing means, each of said cushioning supporting members being in direct communication with a different one of said housing sections, a pair of valves for closing ports of the housing sections communicating with the portion of the system leading to said driven fluctuation producing means, springs normally holding said valves in closed positions and connected to said diaphragm, and said diaphragm being displaced toward one section of the housing by an excess load on the cushioning supporting member connected to the other section of the housing for varying the tension of said springs to cause one of the valves to open when the pressure is increased in the system by the fluctuation producing means to permit the compressed medium to pass to said aforementioned, overloaded cushioning supporting member, and another valve of said directing unit being opened when the fluctuating pressure in the system diminishes to permit the compressed medium from the other, underloaded cushioning supporting member to flow past the directing unit toward said fluctuation producing means.

6. A vehicle balancing unit comprising a conduit system closed throughout and containing a compressible medium under pressure, laterally spaced oppositely positioned cushioning supporting members connected to and forming a part of the conduit system and adapted to be interposed between laterally spaced portions of an undercarriage and bolster of a vehicle truck for yieldably supporting the bolster above the undercarriage and adapted to provide a yieldable support between the undercarriage and a portion of a load carrying body supported on the bolster, said cushioning supporting members being laterally spaced relatively to the body and truck and substantially equally spaced from the sides thereof, said cushioning supporting members each including an inflated chamber capable of being compressed in response to lateral tilt of the vehicle body; a pump in the conduit system, means for continuously driving the pump when the vehicle is in motion, a directing unit interposed in the conduit system between the pump and the cushioning supporting members, said directing unit having ports connecting each cushioning supporting member with the pump, valves for closing said ports when the pressure in the cushioning members is substantially equalized to prevent the compressed medium from flowing past the directing unit, springs for normally retaining the valves in closed positions, the operation of the pump causing a fluctuation of the pressure in the portion of the conduit system between the pump and directing unit, and an unbalanced load condition on the body acting to increase the pressure on an overloaded cushioning supporting member to vary the tension of the springs for causing one of the valves to open when the pressure is increased by the pump to supply the compressed medium to the overloaded cushioning supporting member and for permitting another of the valves to open when the pressure adjacent the pump diminishes to allow the compressed medium to pass from an underloaded cushioning supporting member past the directing unit toward the pump.

7. A vehicle balancing system as in claim 6, said pump including a compression chamber and a bellows communicating therewith at one of its ends, a driven eccentric, constituting the means for continuously driving the pump, connected to the opposite end of said bellows for reciprocating said last mentioned end toward and away from said compression chamber.

8. A vehicle balancing system as in claim 6, said pump including a compression chamber and a bellows communicating therewith at one of its ends, a driven eccentric, constituting the means for continuously driving the pump, connected to the opposite end of said bellows for reciprocating said last mentioned end toward and away from said compression chamber, and a prime mover connected to and driving the eccentric.

9. A vehicle balancing system as in claim 6, said pump including a compression chamber and a bellows communicating therewith at one of its ends, a driven eccentric, constituting the means for continuously driving the pump, connected to the opposite end of said bellows for reciprocating said last mentioned end toward and away from said compression chamber, said driven eccentric being adapted to be fixed to a wheel axle of the truck.

10. A vehicle balancing system as in claim 6, said pump including a reciprocating bellows, said means for continuously driving the pump including a lever pivotally supported on the bolster and pivotally connected to an end of the bellows, said lever having a cam slot, a bell crank pivotally supported on the bolster and having one end pivotally connected to the undercarriage and its opposite end engaging said cam slot for rocking the lever to reciprocate the pump bellows when said bolster is moved relatively to the undercarriage in response to vibrations of the truck.

11. In a closed balancing system containing a compressible medium, cushioning supporting members adapted to be interposed between a nonyielding supporting surface and a superimposed load for yieldably supporting the load on said surface, each of said cushioning supporting members having an inflatable chamber forming a part of the closed system, a continuously driven pump connected to the system for causing a fluctuation of pressure therein, and a directing unit interposed in the system between the pump and said cushioning supporting members, said directing unit having spring loaded valves responsive to the fluctuations in pressure in the system when an unbalanced load condition exists on the cushioning supporting members whereby upon upward fluctuation of the pressure in the system between the pump and directing unit the compressed medium will pass through the directing unit to an overloaded cushioning supporting member and on a downward fluctuation of pressure in the system the compressed medium will pass from an underloaded cushioning supporting member through the directing unit toward the pump.

12. A balancing system as in claim 11, said directing unit comprising an elongated housing, a flexible diaphragm dividing said housing into corresponding ends, each of said housing ends being in direct communication with one of said cushioning supporting members and being connected to a portion of the system leading to the pump, each of said housing sections having a pair of said valves interposed between the diaphragm and the portion of the system leading to the pump and normally disposed in closed positions, springs for said valves connected to said diaphragm for maintaining the valves in closed positions when a substantially balanced load condition exists on the cushioning supporting members, and said diaphragm being displaceable relatively to said sections in response to pressure produced by an overloaded cushioning supporting member for varying the tension of said springs to permit certain of the valves to open and close in response to the fluctuation of pressure in the system produced by the pump.

ROBERT A. POAGE.

REFERENCES CITED

The following references are of record in the file of this patent:

UNITED STATES PATENTS

| Number | Name | Date |
|---|---|---|
| 779,858 | Lillie | Jan. 10, 1905 |
| 1,008,290 | Verge | Nov. 7, 1911 |
| 1,303,808 | Loraille | May 6, 1919 |
| 2,088,487 | Schoepf et al. | July 27, 1937 |
| 2,095,677 | Schoepf et al. | Oct. 12, 1937 |
| 2,192,365 | Kuhn | Mar. 5, 1940 |
| 2,208,537 | Brown | July 16, 1940 |
| 2,469,962 | Gouirand | May 10, 1949 |
| 2,474,471 | Dolan | June 28, 1949 |